TAPE MAGAZINE HAVING LOOP BLOCKING MEANS

Filed Dec. 29, 1965

*INVENTORS.*
DONALD S. IRONSIDE
*BY:* WAYNE A. WATTS
Francis J. Thomas
ATTORNEY

United States Patent Office 3,346,161
Patented Oct. 10, 1967

3,346,161

TAPE MAGAZINE HAVING LOOP BLOCKING MEANS

Donald S. Ironside, King of Prussia, Pa., and Wayne A. Watts, Camden, N.J., assignors, by mesne assignments, to DASA Corporation, Andover, Mass., a corporation of Massachusetts Filed Dec. 29, 1965, Ser. No. 517,382
10 Claims. (Cl. 226—196)

This invention relates to a tape device, and, in particular, to a device for controlling the movement of data bearing tape in a storage area.

A United States patent application, Ser. No. 383,739, filed on July 20, 1964, by David L. Nettleton and James E. Palmer, and entitled "Tape Transport," shows an apparatus wherein a long magnetic tape is loosely stored on its edge with a configuration of loops or folds. The loops are somewhat randomly formed as the tape is supplied to the storage area and, as the tape is withdrawn from the storage area through an access gap, the loops unfold. During withdrawal, the portion of tape leaving the storage area often tends to cause an unwanted loop to be brought in the vicinity of the access gap of the storage area. If a loop enters this gap, the tape transport may be jammed and require servicing.

In the present invention, the floor of the access gap contains a projecting member or ledge which acts against the lower edge of the unwanted tape loop to block its movement in the direction of the access gap. The portion of the tape which is to be removed is not blocked by the ledge but, rather, is pulled over the ledge by that portion of the tape which has already passed the gap.

While a variety of configurations of the projecting member can provide satisfactory operation, the preferred embodiment of the invention employs a ledge. The floor in the vicinity of the access gap is higher than the floor of the storage area. The preferred embodiment of the invention also contains a lowered ceiling in the vicinity of the access gap to increase the likelihood of blocking unwanted loops that may occasionally be vibrated away from the floor of the storage area. In effect, the preferred embodiment of the invention makes use of an access gap whose vertical height is only slightly greater than the width of the tape and a storage area having a recessed floor and elevated ceiling.

It is thus an object of the present invention to provide apparatus for controlling the movement of tape.

Another object is to provide an apparatus for controlling tape loops or folds in a storage area to prevent their jamming an access gap.

A further object is to provide an apparatus for loosely storing a long tape on its edge with a configuration of relatively random-shaped loops or folds, and to maintain the unwanted loops away from the access gap to avoid jamming the apparatus.

The foregoing and other objects, features and advantages of the invention will be apparent from the following more particular description of a preferred embodiment of the invention, as illustrated in the accompanying drawings.

Figure 1:
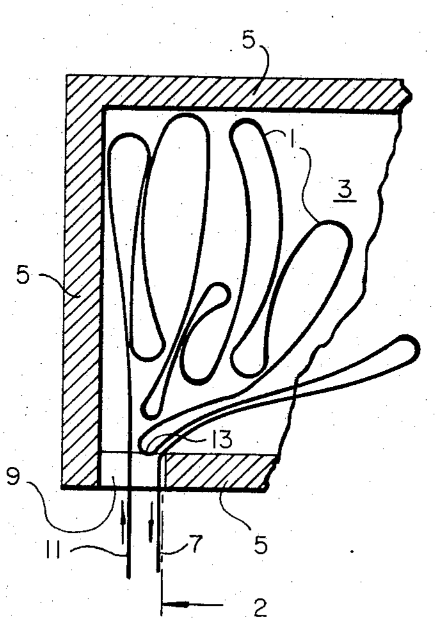
FIG. 1 is a top view of the preferred embodiment of the invention with the top or ceiling removed.

In FIG. 1, a long magnetic data storage tape 1 is stored on its edge in a storage area 3 which is encased by walls 5. A portion 7 of the tape is pulled from the storage area through an access gap 9 in one of the walls. Tape 11 to be stored is fed into the storage area 3 through the access gap 9 and forms into relatively random-shaped loops or folds within the area.

As shown in FIG. 1, there is a tendency for an unwanted loop or fold 13 in the vicinity of the access gap to be drawn into the gap by the frictional force exerted by the emerging tape 7. The unwanted loop 13, if not blocked, can jam the access gap and the external tape drive and data accessing mechanism (not shown).

Figure 2:
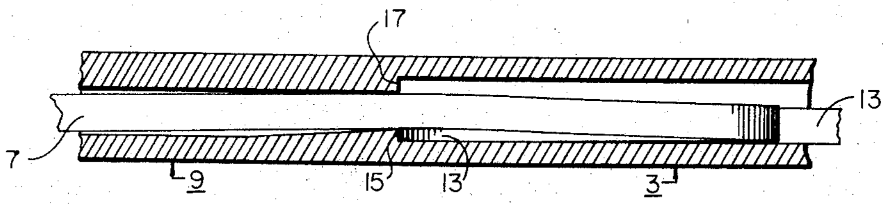
FIG. 2 is an enlarged vertical section taken along the line 2—2 of FIG. 1.

The unwanted tape loop 13 is blocked by the configuration of the access gap 9, as better shown in FIG. 2, where the properly emerging tape 7 is shown in front of the unwanted loop 13. The height of the access gap 9 is slightly greater than the width of the tape, and the height of the storage area 3 is significantly greater than the height of the access gap. A ledge 15 at the bottom of the access gap 9 prevents the unwanted loop 13 from entering the gap; while the portion of tape which is to properly emerge from the storage area is pulled over the ledge 15 by the already-emerged tape 7.

In FIG. 2, an upper ledge 17 is positioned above or slightly to the right of the lower ledge 15. The upper ledge blocks unwanted tape loops which may be vibrated away from the floor of the storage area 3.

The combination of both ledges 15, 17 separated by a distance only slightly greater than the width of the tape insures that unwanted tape loops are reliably blocked from the access gap to prevent jamming of the apparatus.

While the invention has been particuarly shown and described with reference to a preferred embodiment thereof, it will be understood by those skilled in the art that the foregoing and other changes in form and details may be made therein without departing from the spirit and scope of the invention.

What is claimed is:

1. A tape storage device comprising in combination:

a storage area having a floor and a ceiling and adapted to store a tape on an edge on the floor in a configuration of loops;

and an access means adjacent the storage area having a floor and a ceiling and adapted to permit the removal of tape, the floor of the access means being elevated with respect to the floor of the storage area to form a ledge;

whereby unwanted tape loops are blocked from entering the access means by the ledge.

2. The device described in claim 1, wherein the height of the access means slightly exceeds the width of tape to be stored.

3. The device described in claim 1, wherein the ceiling of the access means is lower than the ceiling of the storage area.

4. The device described in claim 2, wherein the ceiling of the access means is lower than the ceiling of the storage area.

5. The device described in claim 1, wherein the access means is adapted to permit both the entrance and removal of tape.

6. The device described in claim 5, wherein the height of the access means slightly exceeds the width of the tape to be stored.

7. The device described in claim 5, wherein the ceiling of the access means is lower than the ceiling of the storage area.

8. The device described in claim 6, wherein the ceiling of the access means is lower than the ceiling of the storage area.

9. The device described in claim 1, wherein the access means comprises a gap in a wall adjacent the storage area.

10. The device described in claim 5, wherein the access means comprises a gap in a wall adjacent the storage area.

References Cited

UNITED STATES PATENTS

| | | | |
|---|---|---|---|
| 1,297,049 | 3/1919 | Webster | 226—118 |
| 2,238,548 | 4/1941 | Andrews | 206—51 |
| 3,306,510 | 2/1967 | Brumbaugh | 226—196 X |

M. HENSON WOOD, Jr., *Primary Examiner.*

A. N. KNOWLES, *Assistant Examiner.*